United States Patent
Kovatsch

(10) Patent No.: US 11,973,838 B2
(45) Date of Patent: Apr. 30, 2024

(54) DEVICES AND METHODS FOR MANAGING SUBSCRIPTIONS OF SUBSCRIBERS

(71) Applicant: HUAWEI TECHNOLOGIES CO., LTD., Shenzhen (CN)

(72) Inventor: Frank Matthias Kovatsch, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/941,385

(22) Filed: Sep. 9, 2022

(65) Prior Publication Data

US 2023/0006958 A1 Jan. 5, 2023

Related U.S. Application Data

(63) Continuation of application No. PCT/EP2020/056404, filed on Mar. 11, 2020.

(51) Int. Cl.
*H04L 67/55* (2022.01)
*H04L 12/18* (2006.01)
*H04L 67/50* (2022.01)

(52) U.S. Cl.
CPC .......... *H04L 67/50* (2022.05); *H04L 12/1859* (2013.01); *H04L 67/55* (2022.05)

(58) Field of Classification Search
None
See application file for complete search history.

(56) References Cited

U.S. PATENT DOCUMENTS

| | | | |
|---|---|---|---|
| 9,680,923 B1* | 6/2017 | Jain | H04L 67/53 |
| 2005/0021622 A1 | 1/2005 | Cullen | |
| 2006/0117035 A1 | 6/2006 | Stewart et al. | |
| 2009/0109889 A1* | 4/2009 | Budampati | H04L 12/1895 370/312 |
| 2010/0321204 A1* | 12/2010 | Bae | H04Q 9/00 340/870.01 |
| 2011/0191425 A1* | 8/2011 | Brodeur | H04L 51/222 709/206 |
| 2011/0289163 A1 | 11/2011 | Edwards et al. | |
| 2013/0151673 A1* | 6/2013 | Gouache | H04L 65/765 709/219 |

(Continued)

OTHER PUBLICATIONS

OPC Foundation, OPC Unified Architecture, OPC UA Part 14—PubSub Release 1.04 Specification.docx, Feb. 6, 2018, 164 pages.

(Continued)

*Primary Examiner* — James A Edwards
(74) *Attorney, Agent, or Firm* — HAUPTMAN HAM, LLP

(57) ABSTRACT

A device for managing subscriptions of subscribers stores subscription entries. Each subscription entry includes information indicating data of interest in a first part, and includes subscriber information related to subscribers of the data of interest in a second part. Moreover, a subscription entry of the subscription entries includes in its second part subscriber information related to at least two subscribers of the data of interest indicated by the information in the first part. The device further provides the data of interest indicated by the information in the first part of the subscription entry to the at least two subscribers associated with the subscriber information in the second part.

20 Claims, 8 Drawing Sheets

(56) References Cited

U.S. PATENT DOCUMENTS

| | | | | |
|---|---|---|---|---|
| 2015/0039734 | A1* | 2/2015 | King | H04L 12/1859 709/221 |
| 2016/0063412 | A1* | 3/2016 | Beckmann | H04L 51/00 705/7.23 |
| 2016/0173595 | A1* | 6/2016 | Miller | H04L 67/63 709/217 |
| 2017/0339245 | A1* | 11/2017 | Pacella | H04L 67/306 |
| 2018/0191663 | A1* | 7/2018 | Harpaz | G06F 16/9535 |

OTHER PUBLICATIONS

Sven Akkermans et al., Towards Efficient Publish-Subscribe Middleware in the IoT with IPv6 Multicast, 2016 IEEE International Conference on Communications (ICC), IEEE, May 22-27, 2016, 6 pages.
Oma, Lightweight Machine to Machine Technical Specification: Core, OMA-TS-LightweightM2M_Core-V1_1-20180710-A, Aug. 6, 2018, 142 pages.
OASIS, MQTT Version 5.0, OASIS Standard, https://docs.oasis-open.org/mqtt/mqtt/v5.0/os/mqtt-v5.0-os.docx, Mar. 7, 2019, 137 pages.
S. Li et al., Conditional observe in CoAP, draft-li-core-conditional-observe-05, core, Internet-Draft, Apr. 18, 2015, 14 pages.
M. Kovatsch et al., CoAP Implementation Guidance, draft-ietf-lwig-coap-06, LWIG Working Group, Internet-Draft, Jan. 3, 2019, 31 pages.
K. Hartke, Observing Resources in the Constrained Application Protocol (CoAP), Internet Engineering Task Force (IETF), Request for Comments: 7641, Category: Standards Track, Sep. 2015, 30 pages.
International Search Report issued in corresponding International Application No. PCT/EP2020/056404, dated Oct. 30, 2020, pp. 1-13.

* cited by examiner

DEVICES AND METHODS FOR MANAGING SUBSCRIPTIONS OF SUBSCRIBERS

CROSS-REFERENCE TO RELATED APPLICATION(S)

This application is a continuation of International Application No. PCT/EP2020/056404, filed on Mar. 11, 2020, the disclosure of which is hereby incorporated by reference in its entirety.

TECHNICAL FIELD

The present disclosure relates to data management, and particularly to managing subscriptions of one or more subscribers. To this end, a device and a method are disclosed for managing subscription entries of the one or more subscribers. In particular, the device and method may store the subscription entries is such a way, that information indicating subscribed data of interest is stored in association with information indicating one or more, particularly two or more, subscribers of the data of interest.

BACKGROUND

Generally, Internet of Things (IoT) and industrial IoT applications rely on push notifications, also referred to as "subscriptions" or "observing", wherein an entity (a "Subscriber" or "Observer") registers its interest in certain data (i.e., data of interest) together with potential filters or Quality of Service (QoS) requirements, at another entity (a "Publisher" or "Server"). The latter other entity offers the data of interest, and may inform the entity about any relevant changes (e.g., events or new state).

Some devices provide filters along with the subscribe/observe request, in order to reduce the number of messages sent by the device. This may reduce the bandwidth impact on the number of subscribers. For example, it may be possible reduce the load on the subscribing entity, as these filters set a minimum interval between two consecutive notifications or filters on the data to notify only in relevant cases (e.g., large enough change).

However, such devices have an issue, in particular, they increases the memory footprint on resource-constrained devices, as these filters have to be stored in addition. Further, IoT devices have very limited memories (e.g., 10 KiB of RAM), and hence can usually only store a low number of subscribers. Thus, intermediaries such as application-level gateways, caching proxies, or brokers are introduced, to increase the number of subscribers. This, however, requires additional hardware that has to be purchased and maintained. Moreover, the application-level gateways require reconfiguration, for example, every time a sensor is added, changed, or removed. Caching proxies and brokers may introduce a delay, which is an issue in many applications, in particular for industrial IoT.

SUMMARY

In view of the above-mentioned issues and disadvantages, embodiments of the present disclosure aim to improve devices and methods for managing subscriptions of subscribers.

An objective is to increase the number of supported subscribers. In particular, the number of supported subscribers may be increased without additional hardware being necessary (e.g., without an additional memory), neither on the device (e.g., when being a resource-constrained device) itself nor on the network (e.g., intermediaries).

The objective is achieved by one or more embodiments of the disclosure as described herein.

A first aspect of the present disclosure provides a device for managing subscriptions of subscribers using one or more subscription entries, the device being configured to store the one or more subscription entries, wherein each subscription entry comprises information indicating data of interest in a first part, and comprises subscriber information related to one or more subscribers of the data of interest in a second part, wherein at least one subscription entry, of the one or more subscription entries, comprises in its second part subscriber information related to at least two subscribers of the data of interest indicated by the information in the first part; and provide the data of interest indicated by the information in the first part of the at least one subscription entry to the at least two subscribers associated with the subscriber information in the second part.

The device may be or may be incorporated in, for example, an electronic device such as a computer, a laptop, a tablet, a personal computer (PC), a server device, a client device, a publisher of an IoT system, a resource-constrained device for a networked embedded system, etc.

The data of interest may be, for example, some sort of output data that is generated on-the-fly from sensors or calculations. Moreover, the information (indicating the data of interest) may be metadata that indicates, which calculation or sensor, and optionally with which parameters, is to be used to generate the actual data.

For example, the device may be a resource-constrained Publisher. Moreover, the device may optimize how much information has to be stored on the resource-constrained Publisher, which has to manage the subscriptions. For example, instead of having a list with a fixed number of entries (hence limiting the number of subscribers), it may be possible to merge similar subscriptions (i.e., subscriptions to the same dataset or resource) into a single, specifically partitioned subscription entry.

For example, the device of the first aspect may solve an issue of managing subscriptions on resource-constrained Publishers (this is an issue due to the limited memory and bandwidth). The resource-constrained devices may have a statically allocated memory for a fixed number of entries. Moreover, each entry may hold all the information about one subscription (e.g., Subscriber address, identifiers, filters, quality of service requirements).

In devices in accordance with other approaches, a low number of supported subscribers limits the number of applications that can make use of the data. Resource-constrained devices are often used in accordance with other approaches as sensors to monitor the environment, machines, or even products themselves. With the emergence of analytics and artificial intelligence applications, such data becomes of interest for more and more entities, which, however, cannot be added as subscribers.

The device of the first aspect may enable adding more subscribers by optimizing how much information has to be stored, e.g., by splitting the subscriber entries into two parts as follows: the first part with information indicating (identifier of) the data of interest (e.g., dataset or resource), filters (e.g., queries), and quality of services parameters (e.g., expected notification interval(s)), and the second part with (only) subscriber(-specific) information (e.g., unicast address, token).

For example, the second part may be only one address due to multicast (e.g., in the case of OPC UA PubSub for OPC Unified Architecture (OPC UA PubSub).

According to some embodiments, if the destination of the notifications is a multicast address, no additional information needs to be stored (e.g., the case for OPC UA PubSub). Moreover, if the destination is a unicast address, only the individual address and potentially security identifiers need to be stored separately, which still reduces the memory footprint (compared to storing a complete subscription (e.g., in the case of observing with the IETF Constrained Application Protocol (CoAP).

In an implementation form of the first aspect, the subscriber information comprises one or more of: a unicast or multicast address of one or more subscribers, an identifier (ID) of one or more subscribers, a token related to one or more subscribers.

In a further implementation form of the first aspect, the device is further configured to, if a new subscriber subscribes to a desired data of interest, store information indicating the desired data of interest in the first part of a new subscription entry, and store subscriber information related to the new subscriber in the second part of the new subscription entry; or store, when the information indicating the desired data of interest is already stored in an existing subscription entry, the subscriber information related to the new subscriber in the second part of that existing subscription entry.

In a further implementation form of the first aspect, the device is further configured to merge two or more subscription entries into a merged subscription entry, based on a cost function, wherein the merged subscription entry comprises in its second part subscriber information related to the subscribers associated with each of the two or more subscription entries, and comprises in its first part merged information indicating data of interest that is merged from the information indicating data of interest of each of the two or more subscription entries.

According to some embodiments, merging similar subscriptions may reduce energy requirements. Resource-constrained devices are usually duty-cycled, that is, they enter low-power or sleep modes when idle. When subscriptions are merged, a single wake-up event may be used to prepare the push notification and send it to all subscribers in a single wake cycle.

Furthermore, according to some embodiments, merging similar subscriptions may reduce bandwidth requirements, when multicast addressing is used (e.g., in OPC UA PubSub).

In a further implementation form of the first aspect, the cost function is based on one or more of: maintaining a determined QoS, minimizing a number of subscription entries, minimizing a number of changes in the subscription entries.

In a further implementation form of the first aspect, the device is further configured to merge two or more subscription entries that store identical information indicating data of interest in their respective first parts, by storing subscriber information related to the subscribers associated with each of the two or more subscription entries in the second part of the merged subscription entry.

The device of the first aspect may also merge subscription entries that store non-identical information indicating data of interest. Which entries to merge may be decided by a cost function.

In a further implementation form of the first aspect, the device comprising a first interface configured to receive a subscription request based on obtaining one or more first parameters from a subscriber; and a second interface configured to receive one or more second parameter to update the cost function, or determine a new cost function, based on the received one or more second parameter.

According to some embodiments, the first interface may be different from the second interface. In another implementation form, the device of the first aspect may only comprise the first interface, which is extended over an existing interface to receive the one or more first parameters. The one or more first parameters may support decisions taken based on the cost function. The optional second interface may receive the one or more second parameters to dynamically change the cost function.

For example, the first interface may be an interface that receives the subscription request with parameters from the subscribers. Moreover, the second interface may be an interface that is (only) needed when a cost function is used and receives updates, e.g., by a system administrator. The updates may be parameters (e.g., when minimizing the number of entries is more important than the QoS), but also instructions to support (e.g., a completely new) cost functions (which may go beyond parameters, as it may include executable code, etc.).

In a further implementation form of the first aspect, the received one or more first parameters comprises information indicating data of interest, the information comprising a required QoS and/or an acceptable publishing interval range.

For example, a required QoS and/or publishing interval may be metadata for the data of interest and may further be used as input to the cost function to make a merge decision.

Moreover, the acceptable publishing interval range may comprise an upper and a lower bound for a period or an interval between messages.

In a further implementation form of the first aspect, the device is configured for a publisher of a networked embedded system; and/or at least one subscription entry, of the one or more subscription entries, is based on a subscription provider configured for generating a message for a set of subscribers that are subscribed to the subscription provider of a networked embedded system.

In a further implementation form of the first aspect, the device is further configured to assign to each subscription provider, a publishing interval range; and provide the data of interest of a subscription provider to each subscriber associated with that subscription provider according to a publishing interval within the publishing interval range.

In particular, the subscription provider may be, for example, an OPC PubSub WriterGroup.

Moreover, the subscription provider (e.g., the WriterGroup) may be responsible for all subscribers within a subscription entry, that is, generating a message from the (meta)data indicating the data interest, filling in the subscriber information from the second part for each subscriber, sending the message to each subscriber, etc.

In a further implementation form of the first aspect, the device is further configured to perform an optimization procedure of publishing interval when merging two or more subscription providers, based on a cost function.

For example, the publishing interval may be a concrete interval that is determined such that it may satisfy all acceptable ranges of subscribers and is used to trigger the subscription provider.

Moreover, the device may store the acceptable range(s) for future merge processes. For instance, the device may store them as a combined single range in the first part or it may store them individually in the second part.

In a further implementation form of the first aspect, the merging of two or more subscription providers comprises determining their respective publishing interval ranges; and assigning a merged publishing interval including the respective publishing interval ranges to the merged subscription provider.

In a further implementation form of the first aspect, the cost function is based on one or more of: a publishing interval range associated with a first subscription provider, a publishing interval range associated with a second subscription provider, a publishing interval range of at least one subscriber.

For example, initially, the subscription provider may obtain a concrete publishing interval or a publishing interval range with which the messages may be sent. The concrete publishing interval or the publishing interval range may comprise the intersection of all subscriber ranges as a single range and may further be stored in the first part of the subscriber entry list. The list of the subscriber entry may store information and the subscription provider may perform an action upon this information.

Moreover, the list of the subscriber entry may also be stored individually in the second part of the subscriber entry list. Hence, it may be possible to revert the performed merges, perform actions more flexibly, etc.

According to some embodiments, an acceptable publishing interval range may be provided from the subscribers (e.g., the subscribers have a range associated with them that may either be stored individually in the second part (of the subscription entry) or it may be obtained from a combined intersection stored in the first part). Moreover, the subscription provider may select a concrete value from that range that may satisfy all associated subscribers and may further be adjusted when another subscriber is added.

A second aspect of the present disclosure provides a method for managing subscriptions of subscribers on a publisher using one or more subscription entries, the method comprises storing the one or more subscription entries, wherein each subscription entry comprises information indicating data of interest in a first part, and comprises subscriber information related to one or more subscribers of the data of interest in a second part, wherein at least one subscription entry, of the one or more subscription entries, comprises in its second part information related to at least two subscribers of the data of interest indicated by the information in the first part; and providing the data of interest indicated by the information in the first part of the at least one subscription entry to the at least two subscribers associated with the subscriber information in the second part.

In an implementation form of the second aspect, the subscriber information comprises one or more of: a unicast or multicast address of one or more subscribers, an ID of one or more subscribers, a token related to one or more subscribers.

In a further implementation form of the second aspect, the method further comprises, if a new subscriber subscribes to a desired data of interest, storing information indicating the desired data of interest in the first part of a new subscription entry, and storing subscriber information related to the new subscriber in the second part of the new subscription entry; or storing, when the information indicating the desired data of interest is already stored in an existing subscription entry, the subscriber information related to the new subscriber in the second part of that existing subscription entry.

In a further implementation form of the second aspect, the method further comprises merging two or more subscription entries into a merged subscription entry, based on a cost function, wherein the merged subscription entry comprises in its second part subscriber information related to the subscribers associated with each of the two or more subscription entries, and comprises in its first part merged information indicating data of interest that is merged from the information indicating data of interest of each of the two or more subscription entries.

In a further implementation form of the second aspect, the cost function is based on one or more of: maintaining a determined QoS, minimizing a number of subscription entries, minimizing a number of changes in the subscription entries.

In a further implementation form of the second aspect, the method further comprises merging two or more subscription entries that store identical information indicating data of interest in their respective first parts, by storing subscriber information related to the subscribers associated with each of the two or more subscription entries in the second part of the merged subscription entry.

In a further implementation form of the second aspect, the method comprises receiving, by a first interface, a subscription request based on obtaining one or more first parameters from a subscriber; and receiving, by a second interface, one or more second parameter to update the cost function, or determine a new cost function, based on the received one or more second parameter.

In a further implementation form of the second aspect, the received one or more first parameters comprises information indicating data of interest, the information comprising a required QoS and/or an acceptable publishing interval range.

In a further implementation form of the second aspect, the method is for a publisher of a networked embedded system; and/or at least one subscription entry, of the one or more subscription entries, is based on a subscription provider configured for generating a message for a set of subscribers that are subscribed to the subscription provider of a networked embedded system.

In a further implementation form of the second aspect, the method further comprises assigning to each subscription provider, a publishing interval range; and providing the data of interest of a subscription provider to each subscriber associated with that subscription provider according to a publishing interval within the publishing interval range.

In a further implementation form of the second aspect, the method further comprises performing an optimization procedure of publishing interval when merging two or more subscription providers, based on a cost function.

In a further implementation form of the second aspect, the merging of two or more subscription providers comprises determining their respective publishing interval ranges; and assigning a merged publishing interval including the respective publishing interval ranges to the merged subscription provider.

In a further implementation form of the second aspect, the cost function is based on one or more of: a publishing interval range associated with a first subscription provider, a publishing interval range associated with a second subscription provider, a publishing interval range of at least one subscriber.

A third aspect of the present disclosure provides a computer program comprising a program code for performing the method according to the second aspect or any of its implementation forms.

A fourth aspect of the present disclosure provides a non-transitory computer readable storage medium storing executable program code which, when executed by a processor, causes the method according to the fourth aspect or any of its implementation forms to be performed. Examples of a non-transitory computer readable storage medium include, but are not limited to, a ROM (Read-Only Memory), a PROM (Programmable Read-Only Memory), an EPROM (Erasable PROM), a Flash memory, an EEPROM (Electrically Erasable PROM), a hard disk drive, or the like.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings.

DETAILED DESCRIPTION OF EMBODIMENTS

In the specification, claims, and the accompanying drawings of this application, the terms "first", "second", and the like are intended to distinguish similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "have" and any variant thereof mean to cover the non-exclusive inclusion, so that a process, method, system, product, or device that includes a series of units is not necessarily limited to those units, but may include other units not expressly listed or inherent to such a process, method, product, or device.

Figure 1:
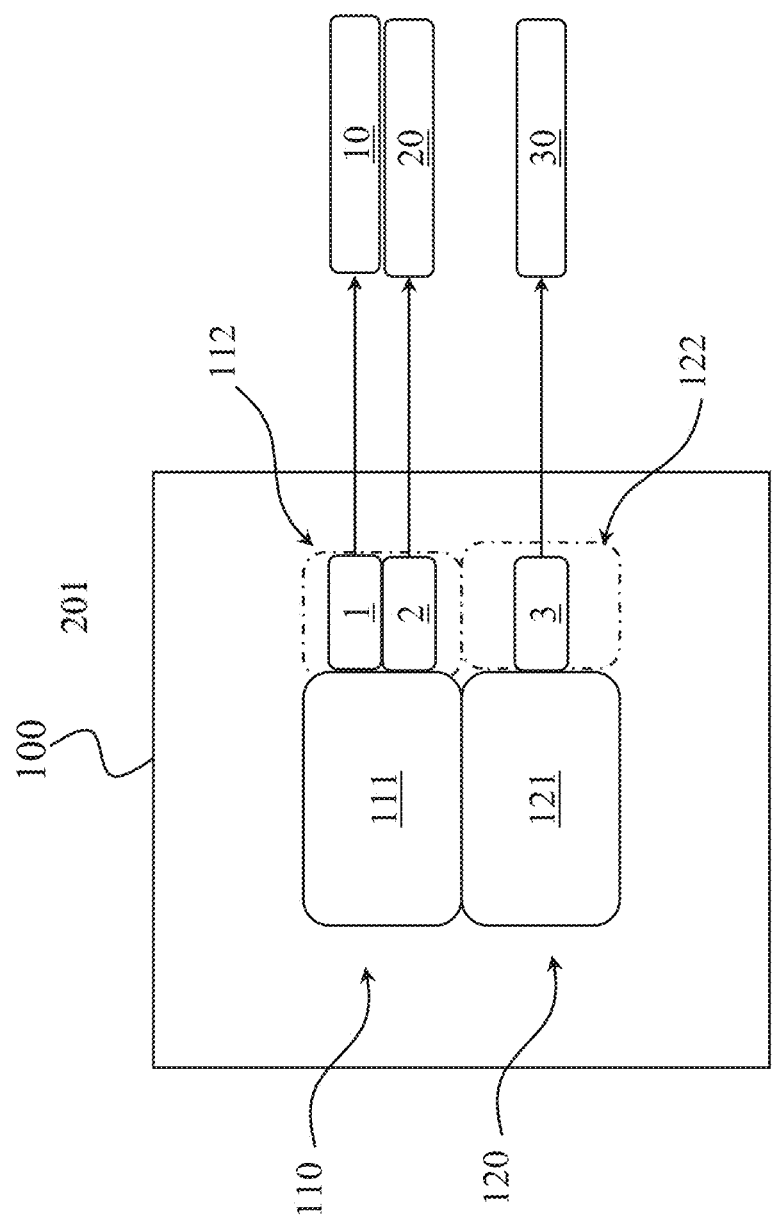
FIG. 1 depicts a schematic view of a device for managing subscriptions of subscribers using one or more subscription entries, according to at least one embodiment of the disclosure.

FIG. 1 depicts a schematic view of a device 100 for managing subscriptions of subscribers 10, 20, 30 using one or more subscription entries 110, 120, according to at least one embodiment of the disclosure.

The device 100 may be an electronic device such as a computer.

The device 100 is configured to store the one or more subscription entries 110, 120, wherein each subscription entry 110, 120 comprises information indicating data of interest in a first part 111, 121, and comprises subscriber information 1, 2, 3 related to one or more subscribers 10, 20, 30 of the data of interest in a second part 112, 122, wherein at least one subscription entry 110, of the one or more subscription entries 110, 120, comprises in its second part 112 subscriber information 1, 2 related to at least two subscribers 10, 20 of the data of interest indicated by the information in the first part 111.

The device 100 is further configured to provide the data of interest indicated by the information in the first part 111 of the at least one subscription entry 110 to the at least two subscribers 10, 20 associated with the subscriber information 1, 2 in the second part 112.

The device 100 may comprise a processing circuitry (not shown in FIG. 1) configured to perform, conduct or initiate the various operations of the device 100 described herein. The processing circuitry may comprise hardware, or a combination of hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In at least one embodiment, the processing circuitry comprises one or more processors and a non-transitory memory connected to the one or more processors. The non-transitory memory may carry executable program code which, when executed by the one or more processors, causes the device 100 to perform, conduct or initiate the operations or methods described herein. Examples of a memory include, but are not limited to, a ROM (Read-Only Memory), a PROM (Programmable Read-Only Memory), an EPROM (Erasable PROM), a Flash memory, an EEPROM (Electrically Erasable PROM), or the like. In some embodiments, the device 100 comprises a non-transitory computer readable storage medium in which data and/or information described herein are stored under control of the processing circuitry. In some embodiments, the device 100 further comprises communication circuitry through which data and/or information described herein are provided to/from the device 100 under control of the processing circuitry. Examples of communication circuitry include an input/output (I/O) interface, a network interface, or the like. Examples of an I/O interface include, but are not limited to, display, touchscreen, keyboard, mouse, or the like. Examples of a network interface include, but are not limited to, wireless network interfaces such as 3G, 4G, 5G, 6G, BLUETOOTH, WIFI, WIMAX, GPRS, or WCDMA; or wired network interfaces such as ETHERNET, USB, or IEEE-2164.

Figure 2:
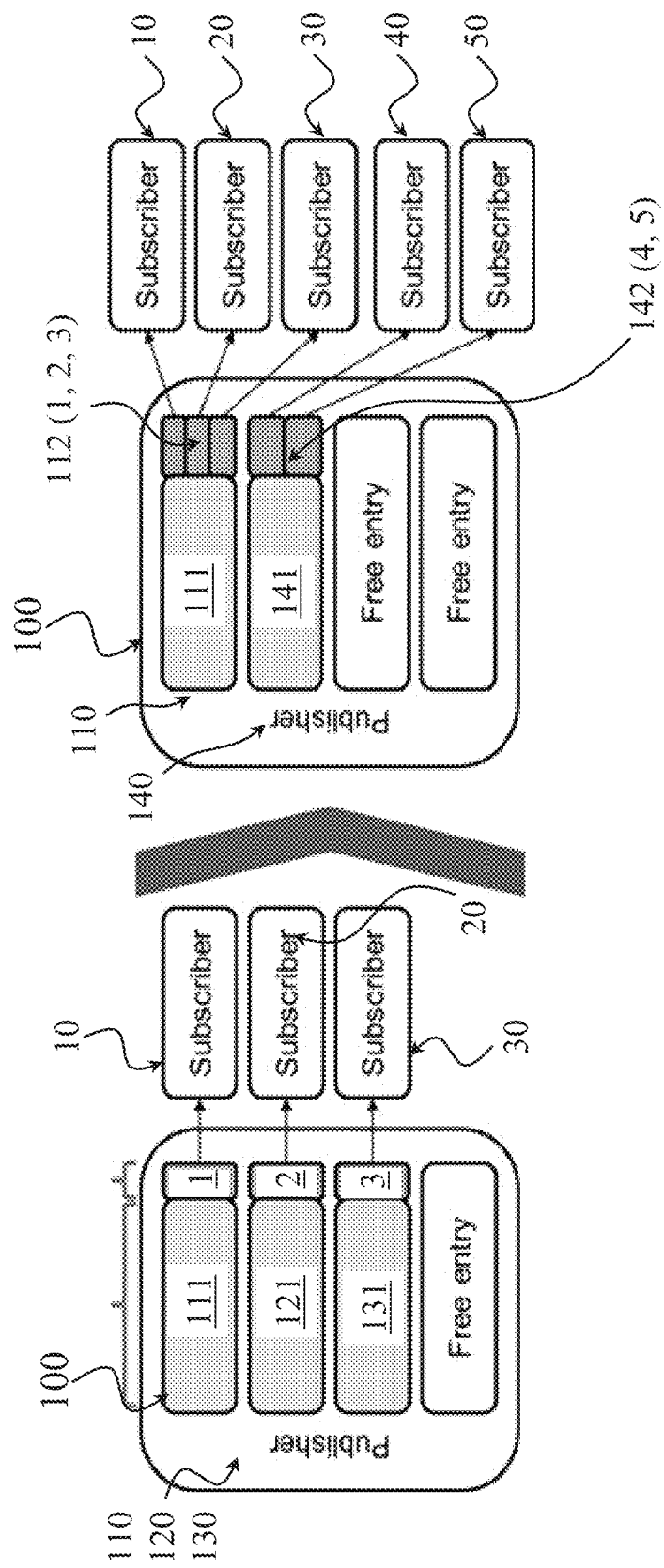
FIG. 2 depicts a diagram illustrating the device merging subscription entries into a merged subscription entry.

FIG. 2 depicts a diagram illustrating the device 100 merging subscription entries 110, 120, 130 into a merged subscription entry 110.

For example, device 100 may merge main subscription information that is information indicating data of interest in the first part to support more subscribers.

The device 100 may be a publisher and may merge three subscription entries 110, 120, 130 (shown on the left side of FIG. 2) that store identical or non-identical information indicating data of interest in their respective first parts 111, 121, 131. For instance, as it can be derived from the right side of FIG. 2, device 100 may store subscriber information 1, 2, 3 related to the subscribers 10, 20, 30 associated with each of the subscription entries 110, 120, 130 in the second part 112 of the merged subscription entry 110.

Moreover, the device may subscribe new subscribers 40, 50 using the new subscription entry 140.

The main part (information indicating data of interest) may often be merged as multiple subscribers may subscribe to the same data (e.g., the resource with the sensor value) and use similar filters (e.g., greater than or step filters for CoAP resources can also be merged when of similar magnitude; value is evaluated at receiver) and quality of service parameters, which depend on application type, and not on individual subscribers.

Figure 3:
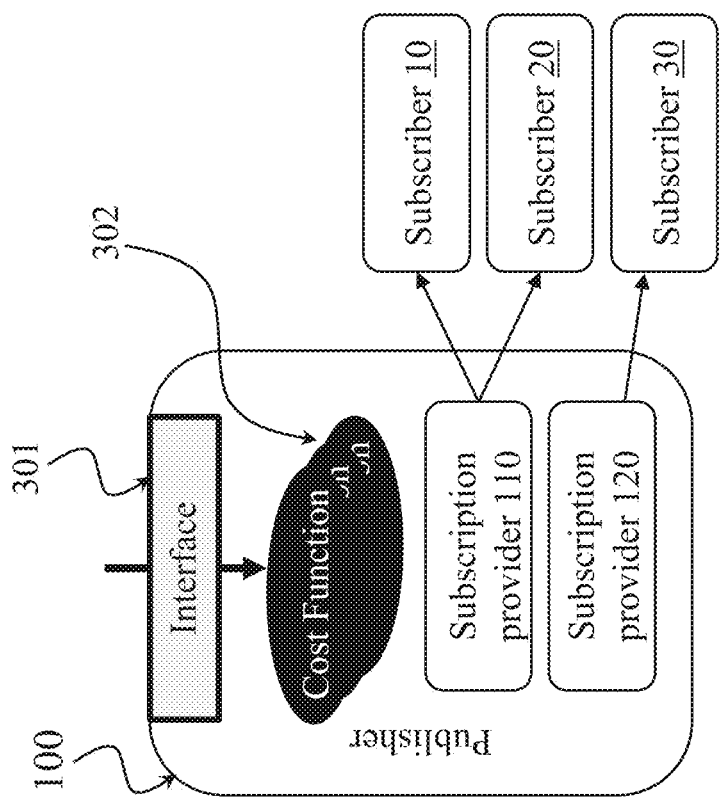
FIG. 3 shows another schematic view of the device comprising an interface for receiving a parameter for updating the cost function.

FIG. 3 shows another schematic view of the device 100 comprising an interface 301 for receiving a parameter for updating the cost function 302.

The device may have the first interface (not shown in FIG. 3) which may receive a subscription request based on obtaining one or more first parameters from a subscriber.

The device may further comprise the second interface 301 which may receive one or more second parameters to update the cost function 302 or determine a new cost function, based on the received second parameters. Examples of the first and/or second interfaces include one or more I/O interfaces described herein.

Moreover, the device 100 may merge the subscription entries 110, 120 into a merged subscription entry 110, based on a cost function 302.

For instance, when the number of subscribers is lower than number of possible subscription entries in a subscriber list, no optimization is required. Afterwards, once the number of subscribers exceeds the listed capacity, a cost function may be used to merge similar subscriptions.

Moreover, the cost function 302 can take different goals or a weighted combination of goals into account. The goals may be defined by the device manufacturer or the system owner. A list of possible goals may be as follow:

Maintaining subscriber QoS: using quality of service parameters to maintain expected notification intervals.

Minimizing the number of subscription entries: freeing as many resources as possible and maximizing sleep cycles, respectively, which might lead to lowering the quality of services for a subset of subscriptions.

Minimizing the number of changes: keeping subscriber configurations stable to avoid network reconfiguration and/or potential service interruptions.

An extensible cost function may enable a strategy for optimization which may be adapted to the environment.

For instance, the subscribers 10, 20, 30 can provide additional parameters that are inputs for the cost function 302 and allow for more effective decisions. For instance, concrete intervals for acceptable publication intervals (e.g., the case for OMA LWM2M based on CoAP) instead of a single publication interval (e.g., the case for OPC UA PubSub) enable a better negotiation with better optimization results (e.g., subscriber QoS easier to preserve).

Optionally, the Publisher (i.e., the device 100) may provide the interface 301 to update the cost function dynamically (i.e., either the second parameters of already included in the cost functions or adding completely new cost function).

Figure 4:
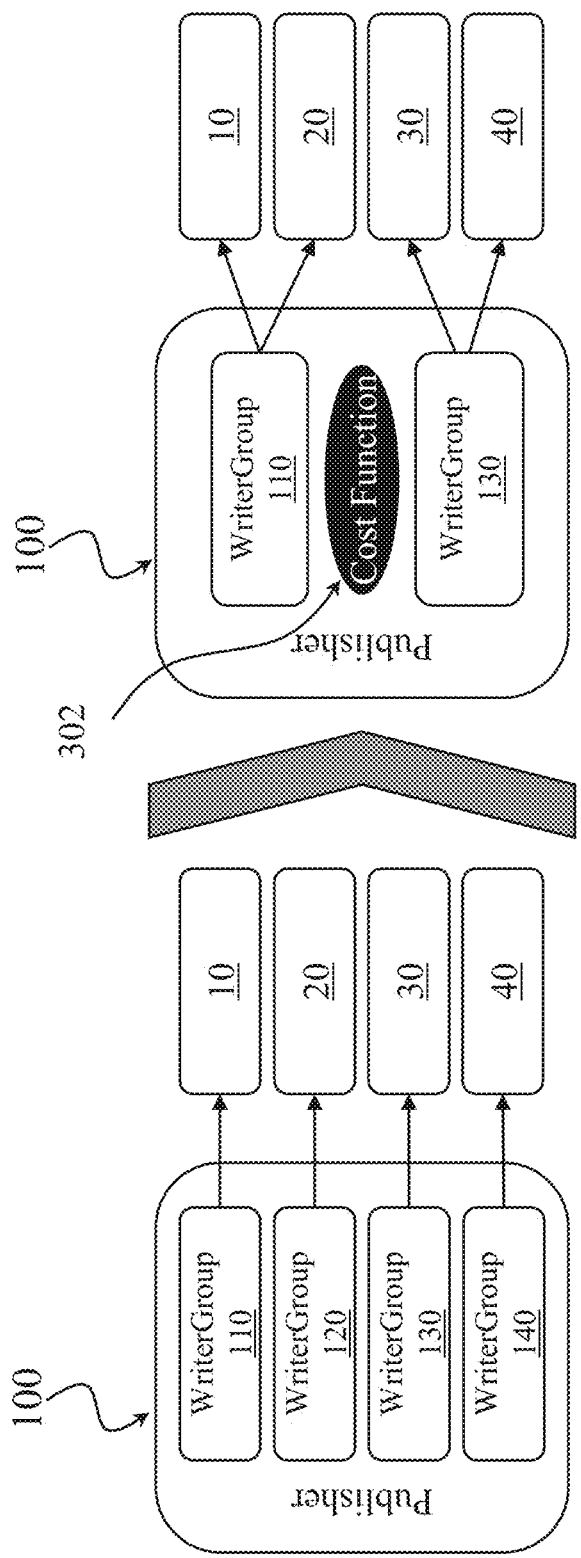
FIG. 4 depicts a diagram illustrating the device merging subscriber entities based on the cost function.

FIG. 4 depicts a diagram illustrating the device 100 merging subscriber entities 110, 120 and 130, 140 based on the cost function 302.

The subscriber entities 110 120, 130, 140 are based on subscription providers which are exemplary WriterGroups (e.g., OPC UA PubSub WriterGroups as explained below).

In FIG. 4, the device 100 is exemplary discussed for OPC UA PubSub on a resource-constrained device. The underlying technology is defined in OPC Unified Architecture Specification Part 14, in which OPC UA PubSub refers to the entities also as Publisher and Subscriber.

In FIG. 4, the subscription entries 110, 120, 130, 140 are embodied by so-called WriterGroups, which produce the messages for the Subscribers 10, 20, 30, 40. WriterGroups require memory and consume bandwidth. The device 10 may merge the subscription entries 110, 120, 130, 140 and may reduce the number of the WriterGroups, i.e., reduce the required memory and/or bandwidth consumption.

Figure 5:
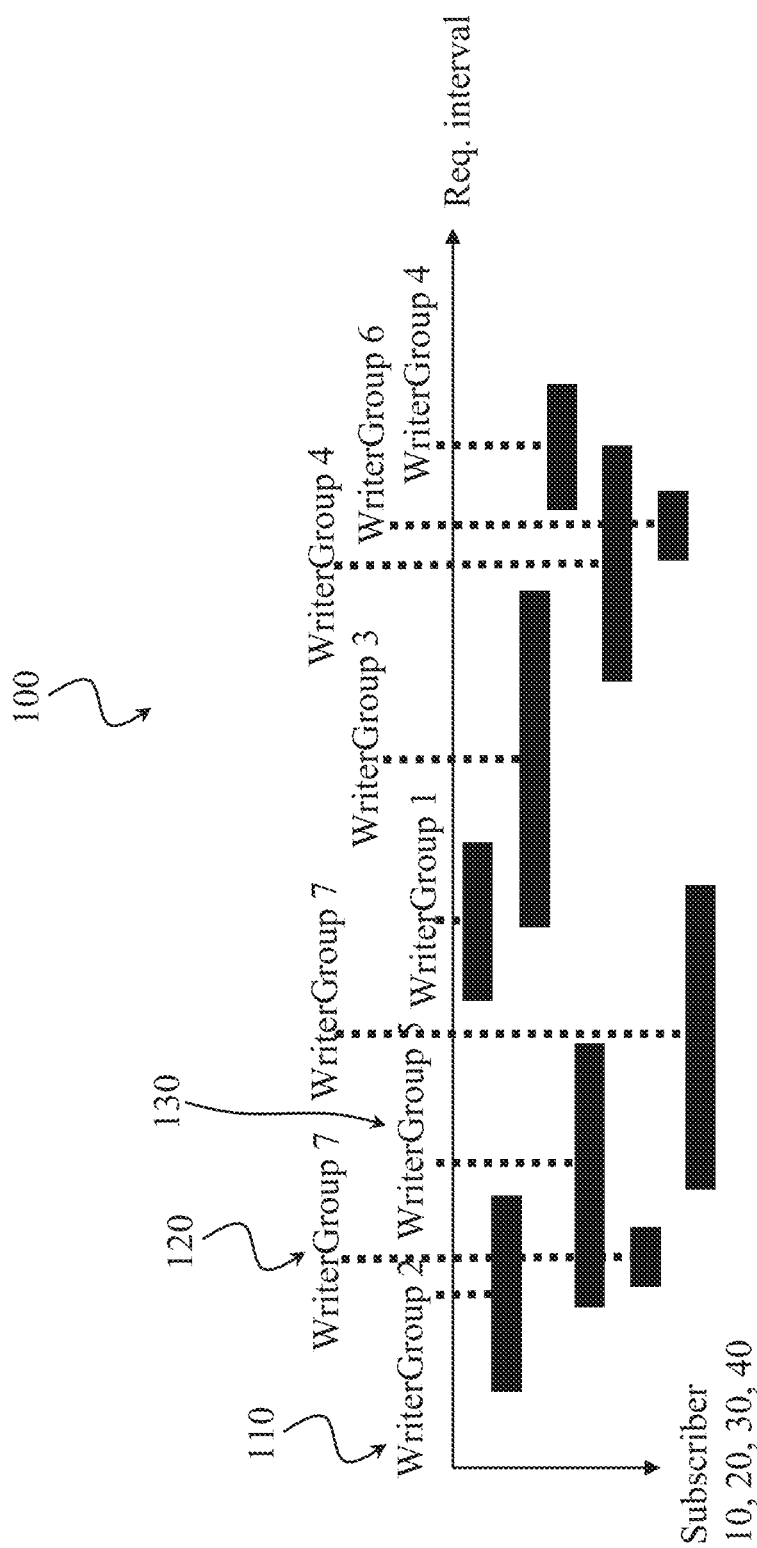
FIG. 5 depicts a diagram illustrating a plurality of unmerged subscription entries.

FIG. 5 depicts a diagram illustrating a plurality of unmerged subscription entries 110, 120, 130, 140. The plurality of unmerged subscription entries 110, 120, 130, 140 is based on the subscription providers which are OPC UA PubSub WriterGroups.

Without optimization, each Subscriber 10, 20, 30, 40 that selects or if it was assigned a unique Publishing Interval requires its own WriterGroup, even if it the same Dataset is sent in the network message (push notification) and multicast addresses are used.

The dotted lines indicate the Publishing Interval. The black rectangles indicate the publishing interval range that may be feasible for the subscriber.

Figure 6:
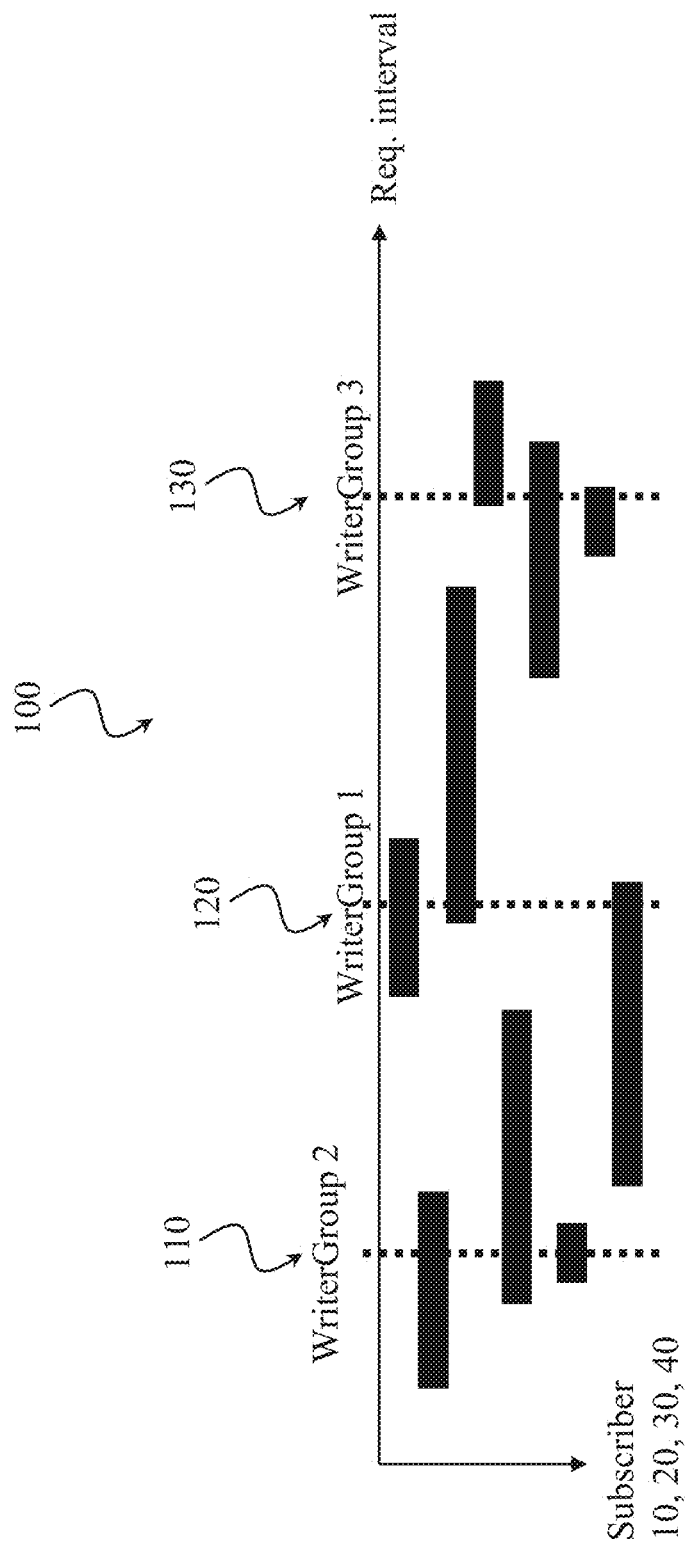
FIG. 6 depicts a diagram illustrating a set of merged subscription entries obtained by the device.

FIG. 6 depicts a diagram illustrating a set of merged subscription entries 110, 120, 130 obtained by the device 100.

The device 100 may merge the WriterGroups when they similar and obtain the merge WriterGroup. The (key) similarity may be the Dataset being sent. Note that for OPC UA, this may be optimized even further, as multiple Datasets may be packed into one Network Message, i.e., different Datasets with similar Publishing Intervals may also be merged.

Figure 7:
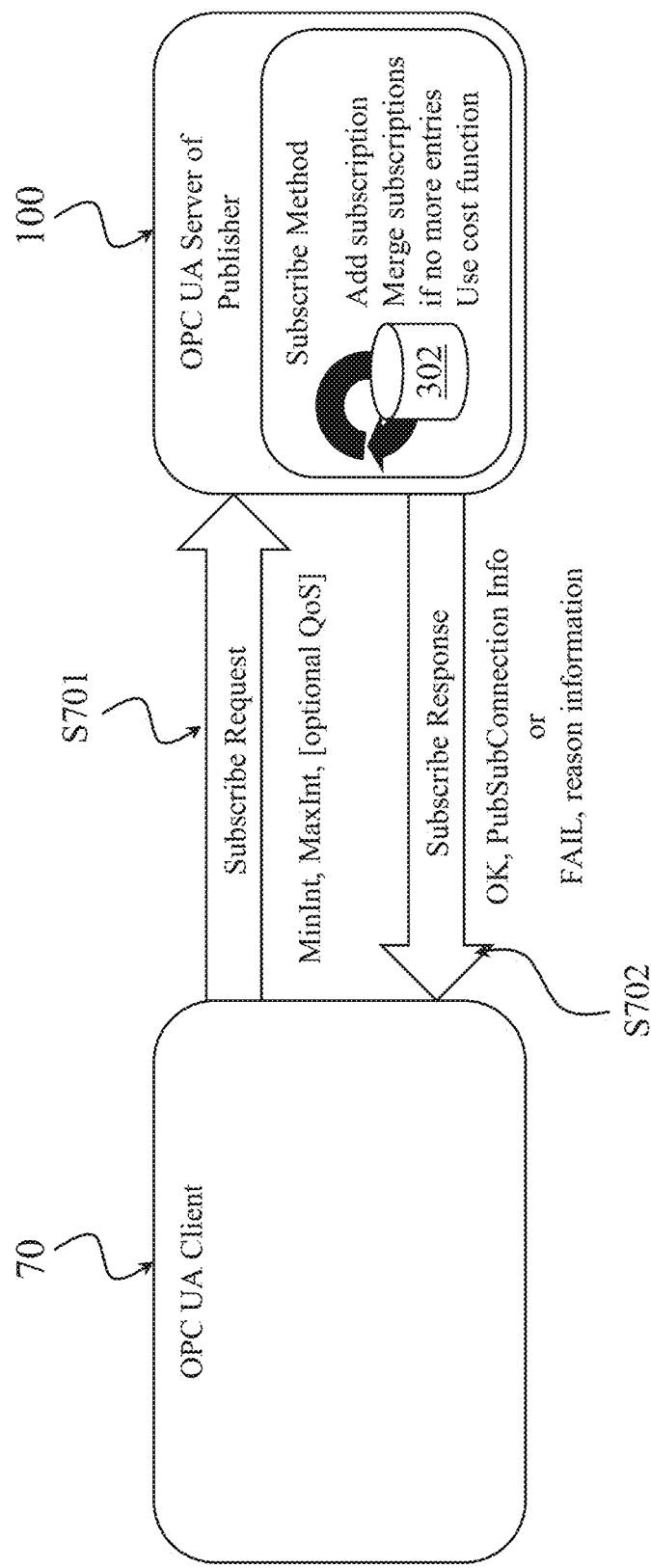
FIG. 7 depicts a diagram illustrating a procedure comprising subscribing a subscriber based on the cost function.

FIG. 7 depicts a diagram illustrating a procedure 700 comprising subscribing a subscriber 70 based on the cost function 302.

The device 100 may perform the procedure 700.

The subscriber 70 is exemplarily an OPC UA Client that establishes a subscription for a Subscriber which may be the same device (subscriber 70) or a connection manager, etc.

The device 100 is exemplarily an OPC UA Server or Publisher which is configured to subscribe. For example, it may add a subscription, merge subscriptions (e.g., if no more entries) based on the cost function 302.

At S701, the OPC UA Client 70 sends a subscribe request to the device 100 which may be sending one or more of: MinInt, MaxInt, and, optionally, QoS.

At S702, the device 100 (the OPC UA Server) sends a subscribe response. The response message may be: OK, PubSubConnection Info; or FAIL, reason information.

For example, by defining not only one selected Publishing Interval for a Subscriber 10, 20, 30, 40, but a supported range with minimum and maximum Publishing Interval allows the cost function 302 to perform an optimization where quality of service requirements can be met (exactly) despite the optimization. Without such additional parameters, the optimization might degrade the quality of service level. The subscribe request corresponds to the Connection Establishment process of the OPC UA Field-Level Communications, which uses Client/Server method calls.

Figure 8:
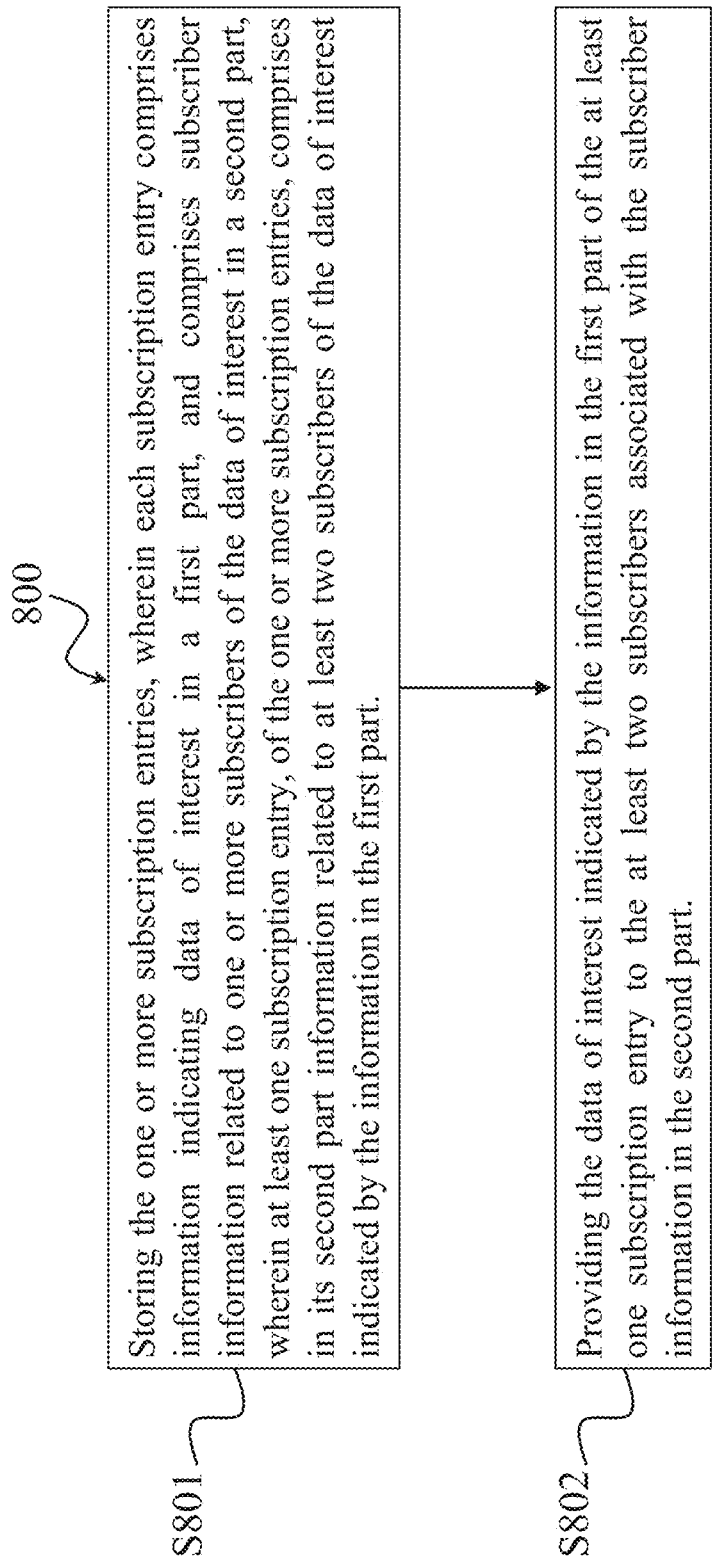
FIG. 8 depicts a flowchart of a method for managing subscriptions of subscribers using one or more subscription entries, according to at least one embodiment of the disclosure.

FIG. 8 shows a method 800 according to at least one embodiment of the disclosure for managing subscriptions of subscribers 10, 20, 30 on a publisher 100 using one or more subscription entries 110, 1120. The method 800 may be carried out by the device 100, as described above.

The method 800 comprises a step S801 of storing the one or more subscription entries 110, 120, wherein each subscription entry 110, 120 comprises information indicating data of interest in a first part 111, 121, and comprises subscriber information 1, 2, 3 related to one or more subscribers 10, 20, 30 of the data of interest in a second part 112, 122, wherein at least one subscription entry 110, of the one or more subscription entries 110, 120, comprises in its second part 112 subscriber information 1, 2 related to at least two subscribers 10, 20 of the data of interest indicated by the information in the first part 111.

The method 800 further comprises a step S802 of providing the data of interest indicated by the information in the first part 111 of the at least one subscription entry 110 to the at least two subscribers 10, 20 associated with the subscriber information 1, 2 in the second part 112.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A device for managing subscriptions of subscribers, the device comprising:
a non-transitory computer readable storage medium configured to store one or more subscription entries,
wherein each subscription entry of the one or more subscription entries comprises information indicating data of interest in a first part, and comprises subscriber information related to one or more subscribers of the data of interest in a second part, and
wherein, in at least one subscription entry of the one or more subscription entries, the second part comprises subscriber information related to at least two subscribers of the data of interest indicated by the information in the first part;
communication circuitry configured to provide the data of interest indicated by the information in the first part of the at least one subscription entry to the at least two subscribers associated with the subscriber information in the second part of the at least one subscription entry;
processing circuitry configured to merge two or more subscription entries into a merged subscription entry, based on a cost function, wherein, in the merged subscription entry,
the second part comprises subscriber information related to the subscribers associated with each of the two or more subscription entries, and
the first part comprises merged information indicating data of interest that is merged from the information indicating data of interest of each of the two or more subscription entries;
a first interface configured to receive a subscription request based on at least one first parameter from a subscriber; and
a second interface configured to receive at least one second parameter to update the cost function, or to determine a new cost function, based on the received at least one second parameter.

2. The device according to claim 1, wherein:
the subscriber information comprises at least one of:
a unicast or multicast address of one or more subscribers,
an identifier, ID, of one or more subscribers, or
a token related to one or more subscribers.

3. The device according to claim 1, wherein:
the cost function is based on minimizing a number of changes in the subscription entries.

4. The device according to claim 1, wherein:
at least one subscription entry, of the one or more subscription entries, is based on a subscription provider configured for generating a message for a set of subscribers that are subscribed to the subscription provider of a networked embedded system.

5. The device according to claim 4, wherein the processing circuitry is further configured to:
assign to each subscription provider a publishing interval range; and
cause the communication circuitry to provide the data of interest of a subscription provider to each subscriber associated with the subscription provider according to a publishing interval within the publishing interval range.

6. The device according to claim 5, wherein:
the processing circuitry is configured to merge two or more subscription providers into a merged subscription provider by:
determining the respective publishing interval ranges of the two or more subscription providers; and
assigning a merged publishing interval including the respective publishing interval ranges to the merged subscription provider.

7. The device according to claim 1, wherein:
the device is configured as a publisher of a networked embedded system.

8. The device according to claim 7, wherein:
the publisher comprises a plurality of subscription providers each configured to generate a message for a set of subscribers that are subscribed to the subscription provider,
the processing circuitry is configured to merge two or more subscription entries by merging two or more of the plurality of subscription providers, and
the plurality of subscription providers comprises OPC Unified Architecture (UA) PubSub WriterGroups.

9. The device according to claim 1, wherein:
the device is configured as a publisher of an Internet of Things (IoT) system.

10. The device according to claim 9, wherein:
the received at least one first parameter comprises:
a minimum publishing interval supported by the subscriber,
a maximum publishing interval supported by the subscriber, and
a Quality of Service (QoS) requirement of the subscriber.

11. The device according to claim 9, wherein:
the processing circuitry is further configured to update the cost function in response to the received at least one second parameter already included in the cost function.

12. The device according to claim 9, wherein:
the second interface is different from the first interface, and is configured to receive the at least one second parameter from a system administrator.

13. The device according to claim 1, wherein:
the device is an OPC Unified Architecture (UA) server or publisher, and
the subscribers are OPC UA clients.

14. The device according to claim 1, wherein:
the device is a duty-cycled device configured to enter a sleep mode when idling, and
in response to a single wake-up event, the device is configured to send, through the communication circuitry, a push notification to all subscribers.

15. The device according to claim 1, wherein:
the subscriber information comprises a multicast address of one or more subscribers.

16. The device according to claim 1, wherein:
the processing circuitry is configured to execute the cost function to merge the two or more subscription entries in response to a number of the subscribers exceeding a number of possible subscription entries in a subscriber list of the device.

17. The device according to claim 16, wherein:
the processing circuitry is configured to not merge subscription entries in response to the number of the subscribers lower than the number of possible subscription entries in the subscriber list of the device.

18. A method of managing subscriptions of subscribers, the method comprising:
storing one or more subscription entries,
wherein each subscription entry of the one or more subscription entries comprises information indicating data of interest in a first part, and comprises subscriber information related to one or more subscribers of the data of interest in a second part, and
wherein, in at least one subscription entry of the one or more subscription entries, the second part comprises subscriber information related to at least two subscribers of the data of interest indicated by the information in the first part;
providing the data of interest indicated by the information in the first part of the at least one subscription entry to the at least two subscribers associated with the subscriber information in the second part of the at least one subscription entry; and
merging two or more subscription entries into a merged subscription entry, based on a cost function, wherein, in the merged subscription entry,
the second part comprises subscriber information related to the subscribers associated with each of the two or more subscription entries, and
the first part comprises merged information indicating data of interest that is merged from the information indicating data of interest of each of the two or more subscription entries,
wherein the method is performed by a publisher of a networked embedded system.

19. The method of claim 18, wherein the data of interest comprise output data generated on-the-fly from a sensor.

20. A non-transitory computer readable storage medium storing a program which, when executed by a computer, causes the computer to perform a method of managing subscriptions of subscribers, wherein the computer is configured as a publisher of a networked embedded system, the method comprising:
storing one or more subscription entries,
wherein each subscription entry of the one or more subscription entries comprises information indicating data of interest in a first part, and comprises subscriber information related to one or more subscribers of the data of interest in a second part, and
wherein, in at least one subscription entry of the one or more subscription entries, the second part comprises subscriber information related to at least two subscribers of the data of interest indicated by the information in the first part;
providing the data of interest indicated by the information in the first part of the at least one subscription entry to the at least two subscribers associated with the subscriber information in the second part of the at least one subscription entry;
merging two or more subscription entries into a merged subscription entry, based on a cost function, wherein, in the merged subscription entry,
the second part comprises subscriber information related to the subscribers associated with each of the two or more subscription entries, and
the first part comprises merged information indicating data of interest that is merged from the information indicating data of interest of each of the two or more subscription entries;
receiving, through a first interface of the publisher, a subscription request and at least one first parameter from a subscriber;
receiving, through a second interface of the publisher, at least one second parameter; and
based on the received at least one second parameter, updating the cost function or determining a new cost function.

* * * * *